US 6,546,124 B1

(12) United States Patent
Hopple et al.

(10) Patent No.: US 6,546,124 B1
(45) Date of Patent: Apr. 8, 2003

(54) METHOD AND APPARATUS FOR PERFORMING AN ADAPTIVE EXTENDED DYNAMIC RANGE ALGORITHM

(75) Inventors: Michael Robert Hopple, Schenectady, NY (US); David Allen Langan, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/426,251

(22) Filed: Oct. 25, 1999

Related U.S. Application Data

(63) Continuation-in-part of application No. 09/346,903, filed on Jul. 2, 1999.

(51) Int. Cl.⁷ .................................................. G06K 9/00
(52) U.S. Cl. .......................... 382/132; 382/131; 378/4
(58) Field of Search ................................ 382/128, 132, 382/168, 169, 209, 232, 237, 257, 260, 263, 274, 282, 308; 348/384.1, 387.1; 250/227.2, 227.21; 378/4, 5, 16, 21, 23, 91, 98.7, 98.11, 98.12, 162; 708/230, 300, 303, 313, 315, 490, 505, 670, 819; 326/22, 88

(56) References Cited

U.S. PATENT DOCUMENTS

| | | | | |
|---|---|---|---|---|
| 5,319,719 A | * | 6/1994 | Nakazawa et al. | 382/132 |
| 5,343,246 A | * | 8/1994 | Arai et al. | 348/363 |
| 5,493,622 A | * | 2/1996 | Tsuchino et al. | 382/132 |
| 5,796,870 A | * | 8/1998 | Takeo | 382/232 |
| 5,991,457 A | * | 11/1999 | Ito et al. | 382/254 |
| 6,069,979 A | * | 5/2000 | VanMetter | 382/260 |
| 6,072,913 A | * | 6/2000 | Yamada | 382/275 |
| 6,141,399 A | * | 10/2000 | Tsujii | 378/98.7 |

OTHER PUBLICATIONS

Copending U.S. patent application Ser. No. 09/522,384, filed Mar. 10, 2000, by David A. Langan et al., entitled "Method and Apparatus for Performing a Contrast Based Dynamic Range Management Algorithm".

* cited by examiner

Primary Examiner—Andrew W. Johns
Assistant Examiner—Shervin Nakhjavan
(74) Attorney, Agent, or Firm—Armstrong Teasdale LLP

(57) ABSTRACT

A method and apparatus are provided for performing an extended dynamic range (EDR) algorithm. The apparatus comprises an EDR processing component which performs the EDR algorithm of the invention in order to compress an image input to the EDR processing component down to a desired gray scale range. The EDR processing component automatically adapts to the dynamic range of an input image so that the input image is compressed down to a desired gray scale range while preserving high frequency contrast information contained in the input image. In addition to automatically adjusting to the dynamic range of the image, the EDR processing component compresses the input image in such a manner that the difference between the input image intensity and the local mean intensity value is taken into account, which prevents artifacts associated with enhanced negative contrast from appearing in the compressed image.

28 Claims, 4 Drawing Sheets

METHOD AND APPARATUS FOR PERFORMING AN ADAPTIVE EXTENDED DYNAMIC RANGE ALGORITHM

This application is a continuation-in-part application of U.S. Patent application Ser. No. 09/346,903, filed Jul. 2, 1999, which application is incorporated herein by reference.

BACKGROUND OF THE INVENTION

The invention relates to a method and apparatus for performing an adaptive extended dynamic range (EDR) algorithm of an x-ray imaging system used for the purpose of compressing an image down to an allowable gray scale range.

One of the fundamental image processing algorithms used in digital x-ray imaging is commonly referred to as extended dynamic range (EDR), which is a form of unsharp masking. The objective of the algorithm is to compress the "DC", or mean, component of different regions comprising the image so that the allowable gray scale range of the displayed image, which typically is 0 to 255, may be applied in a fashion which maximizes the contrast of the higher frequency components of the image.

The human eye is generally only capable of visually perceiving 256 levels of gray (i.e., each pixel being defined by an 8-bit number ranging from 0 to 255). However, images typically have a much greater dynamic range than what is allowed by a gray scale range of 256. Therefore, EDR algorithms are used to compress the image down to the allowable dynamic range defined by 256 levels of gray while attempting to preserve the contrast of the higher frequency components in the image.

The conventional approach to performing the EDR algorithm was simply to subtract the mean from the input signal. However, in some situations, this resulted in important contrast information being removed from the image or being artificially enhanced. Therefore, improvements were subsequently made to the EDR algorithm so that compression would be less likely to result in loss of higher frequency contrast information or introduction of artifacts.

FIG. 1 illustrates an existing EDR processing component currently utilized in x-ray imaging. The EDR processing component shown in FIG. 1 is an improvement over the aforementioned conventional approach in that it does not necessarily perform a straight subtraction of the local mean intensity value from the input intensity value. Rather, the EDR processing component shown in FIG. 1 subtracts more of the local mean intensity value when the input signal has a higher intensity value and less of the local mean intensity value when the input signal has a lower intensity value. This approach preserves more of the high frequency contrast information than the conventional approach.

The EDR processing component of FIG. 1 performs its functions in the following manner. The intensity value X of an input pixel in the image is first processed by a BOXCAR component 1, which determines the local mean intensity value at that particular pixel location. The BOXCAR component utilizes a neighborhood of pixels, which includes the input pixel, to calculate the local mean. The local mean is represented in FIG. 1 by the X with the bar above it.

The solid curve 5 shown in FIG. 7 represents the image intensity of the input signal crossing a heart-to-lung border in the image. The lung corresponds to a higher image intensity than the heart due to the fact that the lung is filled with air and therefore absorbs less x-rays. The dotted curve 6 corresponds to the calculated mean.

Once the BOXCAR component 1 has determined the local mean intensity value, the local mean intensity value is output to the BOOST component 2 which determines how much of the local mean intensity value is to be subtracted from the input signal by the ADD component 3. Typically, the BOXCAR and GAMMA components 2 and 4, respectively, each comprise a lookup table. The respective inputs to these components cause a particular value to be output from the lookup table of the component and delivered to the next component in the processing chain. By using lookup tables in this manner, the EDR functions can be performed quickly in real time on the fly without having to perform the corresponding calculations. The BOXCAR and ADD components 1 and 3, respectively, perform their respective calculations on the fly.

The ADD component 3 subtracts a certain amount of the local mean intensity value from the input signal in accordance with the value output from the lookup table of the BOOST component 2. The dashed curve 7 in FIG. 7 corresponds to the image signal once the mean 6, or a portion of it, has been subtracted from the input signal 5.

Once the local mean intensity value has been subtracted from the input image intensity value, any portion of the signal 7 which has an intensity value greater than 255 is compressed by the GAMMA component 4 to a maximum value of 255. Generally, the GAMMA component 4 is a roll off filter which gradually rolls off the signal to avoid abruptly clipping the signal and creating artifacts in the output signal Y.

The functions of the EDR processing component shown in FIG. 1 can be expressed algorithmically as:

$$y(i, j) = \text{GAMMA}[x(i, j) - \text{BOOST}[\bar{x}(i, j)]],\quad \text{Eq. 1}$$

where $y(i,j)$ is the $(i,j)^{th}$ pixel value of the output image, $x(i,j)$ is the $(i,j)^{th}$ pixel value of the input image and $\bar{x}(i,j)$ is the local mean intensity value of the $(i,j)^{th}$ pixel derived from a BOXCAR average. The lookup table (LUT) of the BOOST component 2 specifies the intensity reduction of the original signal as a function of the local mean intensity value. The LUT of the GAMMA component 4 compresses the result of the subtraction operation to 256 levels (8 bits). The LUTs are indexed by the appropriate pixel intensity values given in the equation.

In the EDR processing component shown in FIG. 1, the BOOST component 2 evaluates the intensity value of the input pixel. When the BOOST component 2 determines that the intensity value of the input pixel is large, the BOOST component 2 determines that a large percentage of the local mean intensity value is to be subtracted from the input signal. The ADD component 3 then subtracts the appropriate percentage of the local mean intensity value from the input signal.

Conversely, when the BOOST component 2 determines that the intensity value of the input pixel is small, the BOOST component 2 determines that a small percentage of the local mean intensity value is to be subtracted from the input signal. The ADD component 3 then subtracts the appropriate percentage of the local mean intensity value from the input signal.

Although the algorithm of the EDR processing component of FIG. 1 improves over algorithms performed by earlier EDR processing components, which merely subtracted the local mean intensity signal from the input signal, the EDR processing component of FIG. 1 assumes that the image is of a particular dynamic range. The person operating the x-ray imaging system is provided with a few settings which allow the user to manually select between one of three dynamic ranges. The EDR processing component then subtracts a particular percentage of the local mean intensity value from the input image intensity value based on the setting selected by the user.

One of the problems with the EDR processing component shown in FIG. 1 is that it relies on selection of the proper dynamic range by the user. If the user fails to select the appropriate setting for the dynamic range, the displayed image may have poor image quality. In many cases, this may result in the loss of more high frequency contrast information than is necessary to perform the compression.

Another problem with the EDR processing component shown in FIG. 1 is that of enhanced blacks caused by exaggeration of negative contrast regions in the image. When a region in the image such as, for example, a vessel filled with dye, has an image intensity which is less than the surrounding local mean intensity value, the EDR processing component of FIG. 1 will exaggerate the negative contrast associated with the darker region when it subtracts the local mean intensity values from the intensity values associated with the darker region. This exaggerated negative contrast may result in artifacts, which can lead to misdiagnosis.

It would be desirable to provide an EDR processing component which overcomes the deficiencies of the aforementioned EDR processing components. In particular, it would be desirable to provide an EDR processing component which overcomes problems associated with enhanced blacks and which adaptively adjusts to the dynamic range of the image so that high frequency contrast information is preserved during compression.

Accordingly, a need exists for an EDR processing component which performs the aforementioned compression algorithm, which automatically adapts to the dynamic range of the image to thereby preserve high frequency contrast information in the compressed image, and which prevents artifacts associated with enhanced blacks from occurring in the compressed image.

BRIEF SUMMARY OF THE INVENTION

The invention provides a method and apparatus for performing an extended dynamic range (EDR) algorithm. The apparatus comprises an EDR processing component which performs the EDR algorithm of the invention in order to compress an image input to the EDR processing component down to a desired gray scale range.

In accordance with a first embodiment of the invention, the EDR processing component automatically adapts to the dynamic range of an input image so that the input image is compressed down to a desired gray scale range while preserving high frequency contrast information contained in the input image.

In accordance with a second embodiment of the invention, the EDR processing component processes the input image in accordance with a dynamic range which is either fixed or which is set by a user. In accordance with this embodiment, the EDR processing component compresses the input image in such a manner that the difference between the input image intensity and the local mean intensity value is taken into account.

In regions where the input image intensity value differs greatly from the local mean intensity value, a relatively smaller percentage of the local mean intensity value is subtracted from the input image. In regions where the difference between the input image intensity value and the local mean intensity value is relatively small, a relatively larger percentage of the local mean intensity value is subtracted from the input image. This prevents enhanced negative contrast artifacts from occurring in the compressed image.

DETAILED DESCRIPTION OF THE INVENTION

In accordance with a first embodiment of the invention, the EDR processing component automatically adapts to the dynamic range of an input image so that the input image is compressed down to a desired gray scale range while preserving high frequency contrast information contained in the input image.

In accordance with a second embodiment of the invention, the EDR processing component processes the input image in accordance with a dynamic range which is either fixed or which is set by a user. In accordance with this embodiment, the EDR processing component compresses the input image in such a manner that the difference between the input image intensity and the local mean intensity value is taken into account.

In regions where the input image intensity value differs greatly from the local mean intensity value, a relatively smaller percentage of the local mean intensity value is subtracted from the input image. In regions where the difference between the input image intensity value and the local mean intensity value is relatively small, a relatively larger percentage of the local mean intensity value is subtracted from the input image. This prevents enhanced negative contrast artifacts from occurring in the compressed image.

In accordance with one embodiment of the invention, the EDR processing component incorporates the first and second embodiments. The EDR processing component automatically adapts to the dynamic range of an input image so that the input image is compressed down to a desired gray scale range while preserving high frequency contrast information contained in the input image. In addition, the EDR processing component compresses the input image in such a manner that the difference between the input image intensity and the local mean intensity value is taken into account so that artifacts associated with enhanced negative contrast do not occur.

Therefore, in accordance with this embodiment, the image is compressed while preserving high frequency contrast information and preventing enhanced negative contrast artifacts from occurring in the compressed image.

Figure 2:
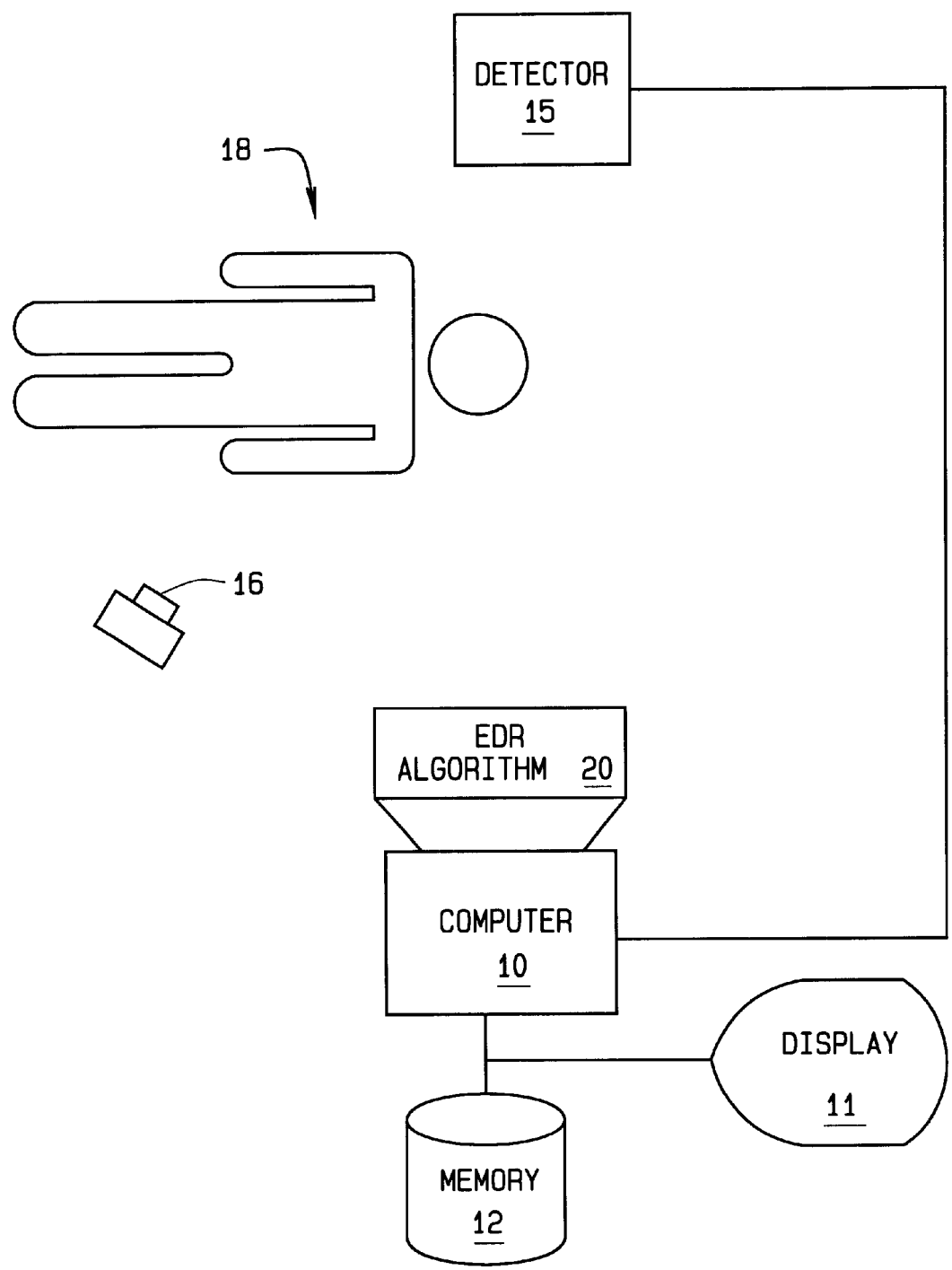
FIG. 2 is an x-ray imaging system which utilizes the EDR processing component of the invention.

FIG. 2 is a block diagram of an x-ray imaging system with which the EDR processing component of the invention can be utilized. The system comprises a computer 10 which is in communication with a display 11 and with a memory element 12. The memory element 12 stores data utilized by the computer 10 to perform the tasks that must be performed by the computer 10, including the EDR functions. The memory element 12 also stores image data which has been acquired by the x-ray imaging system. The system computer 10 is capable of causing processed images to be displayed on the display device 11.

The x-ray imaging system comprises a detector 15, which preferably is a digital detector. The apparatus of the invention comprises an x-ray source 16 for projecting x-rays through the object 18 being imaged, which may be a human patient, for example. The detector 15 receives x-rays that pass through the object 18 and generates voltage signals related to the intensity of the x-rays. The detector 15 outputs voltage signals to the computer 10 which correspond to the x-rays impinging on the detector 15.

If the detector 15 is a digital detector, the voltage signals output to the computer 10 will be digital voltage signals. If the voltage signals output from the detector 15 are analog voltage signals, an analog-to-digital converter (not shown) will be needed to convert the analog voltage signals into digital voltage signals before the signals can be processed by the computer 10.

The computer 10 performs the EDR algorithm 20. This algorithm is functionally represented by the components shown in FIGS. 3, 4 and 6. It should be noted that the term "computer", as that term is used herein, is intended to denote any machine capable of performing the calculations, or computations, necessary to perform the tasks of the invention. In essence, this includes any machine that is capable of accepting a structured input and of processing the input in accordance with prescribed rules to produce an output. The computer 10 can be a single integrated circuit chip (e.g., a microprocessor) or a combination of various integrated circuits (e.g., a plurality of digital signal processor chips) which are in communication with each other.

Preferably, the computer 10 comprises a combination of integrated circuits (i.e., a chip set) configured to perform the tasks of the invention. This combination of integrated circuits preferably is configured using software and then the functions of the integrated circuits are carried out in hardware. By using dedicated hardware in this manner, the functions of the EDR processing component can be carried out very quickly in real time so that the images are displayed on the display monitor in such a manner that it appears that they are being displayed as they are being acquired. However, the EDR algorithm 20 of the invention could also be performed primarily in software, as will be understood by those skilled in the art. For example, a single microprocessor executing the EDR algorithm 20 could be used.

Figure 3:
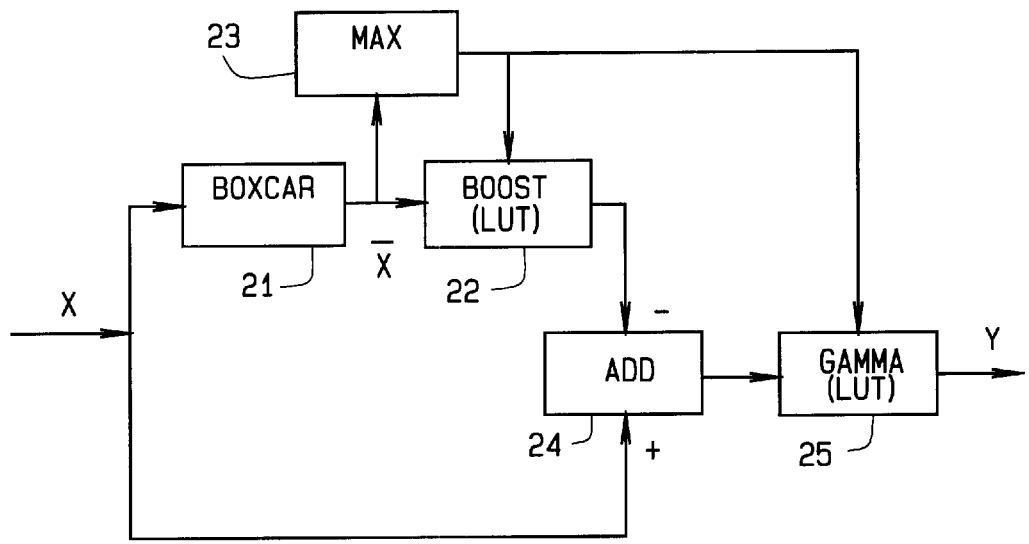
FIG. 3 is a block diagram of the EDR processing component of the invention in accordance with one embodiment which may be implemented by the computer of the x-ray imaging system shown in FIG. 2.

FIG. 3 illustrates a block diagram of the EDR processing component of the invention in accordance with a first embodiment. Each block of the EDR processing component represents one or more functions performed by the computer 10. In accordance with this embodiment, the EDR processing component determines the dynamic range of the input image and utilizes information relating to the dynamic range to cause a certain percentage of the local mean intensity value to be subtracted from the input signal.

By utilizing information relating to the dynamic range of the image to determine the percentage of the local mean intensity value that is to be subtracted from the input signal, the image is only compressed as much as is necessary to bring it within the gray scale range of from 0 to 255. Therefore, the EDR algorithm 20 adapts to the dynamic range of the image to thereby minimize the amount of high frequency contrast information that is removed from the image.

In operation, the BOXCAR component 21 calculates the local mean intensity value in the typical manner discussed above with reference to FIG. 1. The local mean intensity value is then delivered to the BOOST component 22. The local mean intensity value is also delivered to the MAX component 23. The MAX component 23 utilizes the local mean intensity value to determine the maximum mean intensity value, which is then utilized by the MAX component 23 to determine the dynamic range of the image. The BOOST component 22 and the GAMMA component 25 each comprise a plurality of lookup tables. Each of the lookup tables corresponds to a particular sub-range of the total dynamic range.

For example, assuming the maximum intensity value of a pixel of an image prior to compression is 1500, and the minimum intensity value is 0, the total possible dynamic range is from 0 to 1500. Each of the lookup tables in the BOOST component 22 and in the GAMMA component 25 will correspond to a sub-range of the total dynamic range. Preferably, the BOOST component 22 and the GAMMA component 25 each comprise 16 lookup tables which together cover the total dynamic range (i.e., the total dynamic range preferably is divided into 16 sub-ranges). However, the invention is not limited with respect to the number of lookup tables utilized by the BOOST and GAMMA components 22 and 25. Preferably, at least two lookup tables are comprised in the BOOST and GAMMA components 22 and 25.

The MAX component 23 causes one of the lookup tables in the BOOST and GAMMA components 22 and 25, respectively, to be selected. The lookup table is addressed based on the local mean intensity value received from the BOXCAR component 21. The lookup table then outputs a value which is applied to the local mean intensity value to obtain a BOOST output which is a percentage (i.e., 100% or less) of the local mean intensity value. The BOOST output is then subtracted from the input signal by the ADD component 24.

The lookup tables selected are based on the determination by the MAX component 23 of the dynamic range of the image. If the dynamic range is relatively large (i.e., portions of the image are very bright), the lookup table indexed in the BOOST component 22 causes a relatively large amount of the local mean intensity value to be subtracted from the input signal by the ADD component 24. Conversely, if the dynamic range is relatively small (i.e., the image is relatively dark), the lookup table indexed in the BOOST component 22 causes a relatively small amount of the local mean intensity value to be subtracted from the input signal by the ADD component 24.

By utilizing a plurality of lookup tables in the BOOST and GAMMA components 22 and 25, the EDR processing component can adapt to a large number of dynamic ranges quickly on the fly. This allows only the necessary amount of the local mean intensity value to be subtracted from the input signal, thereby allowing compression to be achieved without sacrificing high frequency contrast information.

The determination by the MAX component 23 as to the dynamic range of the image is utilized by the GAMMA component to determine the speed with which the roll off to 255, if necessary, should occur. The error occurring at the ADD component 24 when the image is not compressed to 255 increases as the dynamic range of the image becomes larger. Therefore, when the dynamic range of the image is relatively large, the lookup table indexed in the GAMMA component will cause the signal output from the ADD component 24 to be rolled off relatively gradually. Conversely, when the dynamic range of the image is relatively small, the lookup table indexed in the GAMMA component will cause the signal output from the ADD component 24 to be rolled off less gradually.

It should also be noted that the BOOST component 22 can be disabled by the MAX component 23 if the input image signal is close to the gray scale range of 0 to 255 since no compression is needed.

Figure 1:
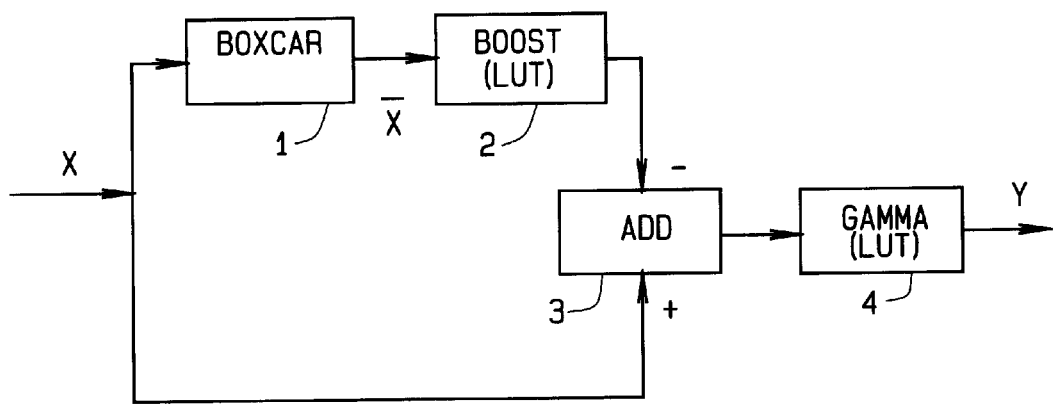
FIG. 1 is a block diagram of an EDR processing component of the prior art.
Figure 7:
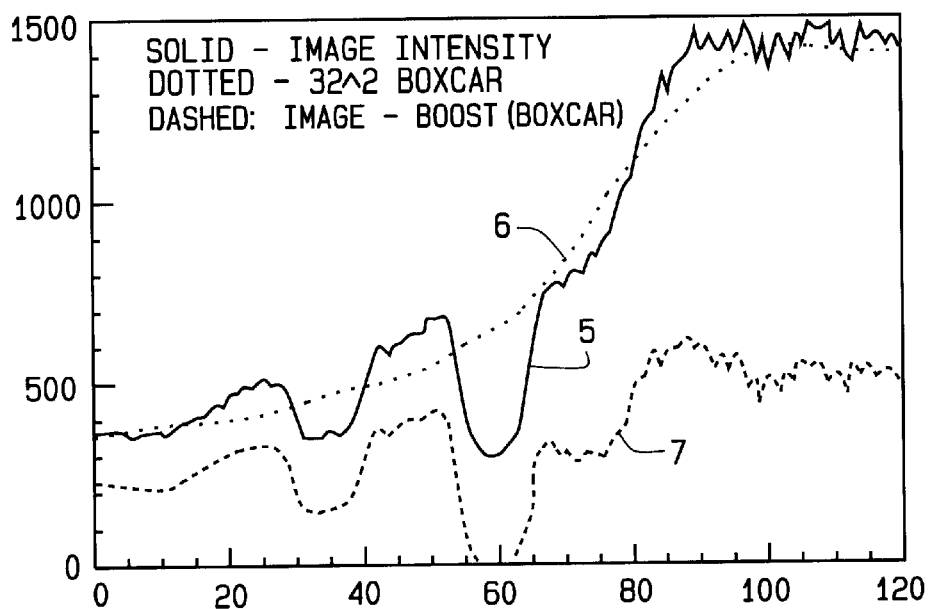
FIG. 7 is a graph illustrating various image intensity curves generated by various components of the EDR processing component.

As stated above in relation to FIG. 1, it is known in the art to utilize lookup tables in the EDR components to eliminate the need to perform calculations on the fly. Therefore, since the manner in which the values of the lookup tables can be selected is known, the manner in which the values are selected for the lookup tables will not be discussed herein in the interest of brevity. As will be understood by those skilled in the art, the values selected for the lookup tables will depend on a variety of design criteria, such as, for example, the type of imaging to be performed (e.g., cardiology, mammography, etc.) by the x-ray imaging system incorporating the EDR processing component of the invention.

Different organs or areas in the human body have different features that are of interest. Similarly, different organs or areas in the human body have certain features that are not of interest and need to be de-emphasized. For example, when the x-ray imaging system is designed to be utilized for imaging a human heart, most of the available dynamic range is allocated to the level of intensity normally associated with the heart. Therefore, the values of the lookup tables will be selected to allocate the majority of the available dynamic range to the range of intensities normally associated with the heart. Similarly, if the system is designed to be used for mammography, the values of the lookup tables will be selected to allocate the majority of the available dynamic range to the range of intensities normally associated with a human breast. Those skilled in the art will understand the manner in which these values are selected.

By utilizing the dynamic range of the image in this manner to adaptively select the percentage of the local mean intensity value that is to be subtracted from the input image signal, only the amount of compression that is necessary is performed, thereby preserving much, if not all, of the high frequency contrast information.

The EDR algorithm of the invention performed by the EDR processing component shown in FIG. 3 can be expressed algorithmically as:

$$y(i, j) = \text{GAMMA}[\text{MAX}[\overline{x}], (x(i, j) - \text{BOOST}[\text{MAX}[\overline{x}], \overline{x}(i, j)])], \quad \text{Eq. 2}$$

where $y(i,j)$ is the $(i,j)^{th}$ pixel value of the output image, $x(i, j)$ is the $(i, j)^{th}$ pixel value of the input image, and $\overline{x}(i, j)$ is the local mean value of the $(i, j)^{th}$ pixel derived from a BOXCAR average. These terms have the same descriptions as those provided above in relation to Eq. 1. The function $\text{MAX}[\overline{x}]$ corresponds to the largest local mean intensity value of the previous incoming image (i.e., the computation of the MAX value incurs one frame of latency). Conversely, the computation of the MAX value could be performed on the current frame and then applied to the following frame so that a frame of latency would not be incurred.

The algorithmic expression of Equation 2 is consistent with the connections between the EDR components shown in FIG. 3. As expressed in Equation 2, the output of the BOOST component 22 is dependent upon the output of the MAX component 23 (i.e., $\text{MAX}[\overline{x}]$ in Eq. 2) and on the local mean intensity value output from the BOXCAR component 21 (i.e., $\overline{x}(i, j)$ in Eq. 2). As seen in Equation 2, the output of the BOOST component 22 (i.e., $\text{BOOST}[\text{MAX}[\overline{x}], \overline{x}(i,j)]$ in Eq. 2) is then subtracted from the intensity value of the input pixel (i.e., $x(i, j)$ in Eq. 2). This operation is performed by the ADD component 24. The output of the GAMMA component (i.e., $y(i, j)$ in Eq. 2) is a function of the output of the MAX component 23 (i.e., $\text{MAX}[\overline{x}]$ in Eq. 2) and of the difference obtained by the ADD component 24 (i.e., $x(i, j) - \text{BOOST}[\text{MAX}[\overline{x}], \overline{x}(i, j)]$).

It should be noted that it is not necessary for lookup tables to be utilized in the BOOST and GAMMA components 22 and 25, respectively, of the EDR processing component shown in FIG. 3. These components could be configured to perform the necessary calculations on the fly. However, performing these calculations on the fly could result in increased hardware complexity and very noticeable delays between the acquisition of the image and the display of the processed image.

In many cases, a physician may be manipulating a medical instrument within a human organ being imaged by the x-ray imaging system and viewing the displayed image to watch the positioning of the image. Therefore, it may be necessary to eliminate any noticeable delay between the image acquisition and the display of the processed image. As stated above, using lookup tables eliminates the need to perform these calculations on the fly and minimizes the delay between image acquisition and the display of the processed image.

It should also be noted that, rather than using lookup tables in the BOOST and GAMMA components 23 and 25, a single memory device could be used in these components. If a single memory device is used in these components, blocks of memory addresses may be allocated to the subranges of the total dynamic range. Those skilled in the art will understand the manner in which a single memory device may be utilized in each of these components for this purpose.

Although the embodiment shown in FIG. 3 results in a displayed image having very good image quality, a signal processing effect commonly referred to as ringing may occur in certain situations where the local mean intensity value is obtained along region boundaries within the image. At region boundaries, the local mean intensity value, $\overline{x}(i, j)$, of the $(i, j)^{th}$ pixel maybe inaccurate due to the fact that the local mean intensity value is calculated based on a group of neighboring pixels which includes pixels from both regions along the boundary and the image.

For example, if the $(i, j)^{th}$ pixel for which the local mean intensity value is being calculated is located in a very bright region in the image, but most of the intensity values utilized in calculating the local mean intensity value correspond to pixels in a relatively dark region on the other side of the boundary, the local mean intensity value for the $(i, j)^{th}$ pixel will be inaccurate because it will primarily reflect the darker intensity values even though the $(i, j)^{th}$ pixel is located in the bright region.

Figure 4:
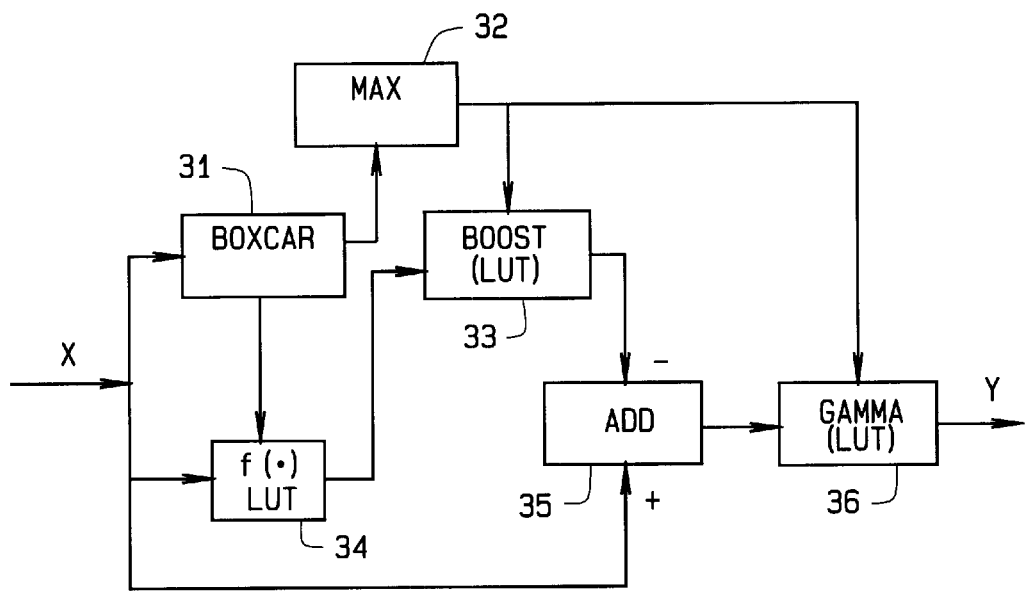
FIG. 4 is a block diagram of the EDR processing component of the invention in accordance with the preferred embodiment which may be implemented by the computer of the x-ray imaging system shown in FIG. 2.

In accordance with the preferred embodiment of the invention shown in FIG. 4, the BOOST component 33 determines the percentage of the local mean intensity value to be subtracted from the input signal based on the maximum local mean intensity value determined by the MAX component 32, the intensity value of the input pixel, (i.e., the (i, j)$^{th}$ pixel) and the local mean intensity value of the (i, j)$^{th}$ pixel.

The operations performed by the EDR processing component of FIG. 4 can be algorithmically expressed as:

$$y(i, j)=\text{GAMMA}[\text{MAX}[\bar{x}],(x(i, j)-\text{BOOST}[\text{MAX}[\bar{x}],f(x(i, j),[\bar{x}](i, j))])], \quad \text{Eq. 3}$$

where y(i, j,) is the (i, j)$^{th}$ pixel value of the output image, x(i, j) is the (i, j)$^{th}$ pixel value of the input image and $[\bar{x}]$(i, j) is the local mean intensity value of the (i, j)$^{th}$ pixel derived from a BOXCAR average. These terms have the same descriptions as those provided in relation to Eqs. 1 and 2. The function MAX$[\bar{x}]$ corresponds to the largest local mean intensity value of the previous incoming image (i.e., the computation of the MAX value incurs one frame of latency). Conversely, the computation of the MAX value could be performed on the current frame and then applied to the following frame so that a frame of latency would not be incurred. The function f(x(i, j),$[\bar{x}]$(i, j)) is a calculation performed by the FUNCTION component 34 to generate an output which is utilized by the BOOST component 33, as discussed below in detail.

Eq. 3 is very similar to Eq. 2. However, as stated above, the BOOST component 33 utilizes the output of the FUNCTION component 34 which, in turn, utilizes the input intensity value x(i, j) and the local mean intensity value $\bar{x}$(i, j). This is reflected in Eq. 3 by the expression BOOST [MAX$[\bar{x}]$, f(x(i, j), $[\bar{x}]$(i, j))]. Therefore, the algorithm expressed by Eq. 3 utilizes the input intensity value, x(i, j), in the BOOST function, whereas the BOOST component 22 shown in FIG. 3 does not.

The EDR processing component shown in FIG. 4 is very similar to the EDR processing component shown in FIG. 3. As with the EDR processing component shown in FIG. 3, the determination by the MAX component 32 of the dynamic range of the image is utilized to select a particular lookup table in the BOOST component 33. However, the EDR processing component shown in FIG. 4 also comprises a FUNCTION component 34 which receives both the input signal and the local mean intensity value calculated by the BOXCAR component 31. The FUNCTION component 34 evaluates the local mean value and the intensity value of the input pixel to determine the difference between the input intensity value and the local mean intensity value. The FUNCTION component 34 operates on the difference between these signals in accordance with a predetermined mathematical function and produces an output which is then provided to the BOOST component 33.

Generally, the FUNCTION component 34 operates on the difference between the input intensity value and the local mean intensity value in accordance with a mathematical function which produces a lookup table address which addresses a lookup table comprised in the FUNCTION component 34. The output of the lookup table comprised in the FUNCTION component 34 is an Adjusted_Mean value. The local mean intensity value output to the FUNCTION component 34 from the BOXCAR component 31 is utilized by the FUNCTION component 34 in accordance with the following equation to produce the Adjusted_Mean value that is provided to the BOOST component 33:

$$\text{Adjusted\_Mean}(i, j)=k*\bar{x}(i, j)+(1-k)*x(i, j), \quad \text{Eq. 4}$$

where k is a constant, $\bar{x}$(i, j) is the local mean intensity value and x(i, j) is the intensity value of the input pixel.

The Adjusted_Mean value output from the FUNCTION component 34 and delivered to the BOOST component 33 is used to index the lookup table in the BOOST component 33. The output of the lookup table of the BOOST component 33 is delivered to the ADD component 35. The ADD component 35 and the GAMMA component 36 perform functions identical to the functions performed by the ADD component 24 and the GAMMA component 25, respectively, shown in FIG. 3.

It should be noted that it is not necessary that the output of the FUNCTION component 34 correspond to an adjustment of the local mean intensity value. Since the output of the FUNCTION component 34 is simply used to address a particular location in a lookup table of the BOOST component 33, the value output from the FUNCTION component 34 does not have to correspond to an adjusted mean value. It will be understood by those skilled in the art that many functions can be implemented to produce a suitable value for this purpose.

As demonstrated by Equation 4, for a value of k that is less than 1 and greater than 0, the Adjusted_Mean value corresponds to a percentage of the local mean intensity value and a percentage of the input intensity value. If the constant k is 1, the Adjusted_Mean value will correspond identically to the local mean intensity value.

The mathematical function utilized by the EDR processing component shown in FIG. 4 to produce the constant k results in an Adjusted_Mean value that corresponds more closely to the local mean intensity value when the difference between the local mean intensity value and the input intensity value is relatively small. Conversely, the function utilized by the EDR processing component shown in FIG. 4 to produce the constant k results in an Adjusted_Mean value that corresponds more closely to the input intensity value when the difference between the local mean intensity value and the input intensity value is relatively large.

Figure 5:
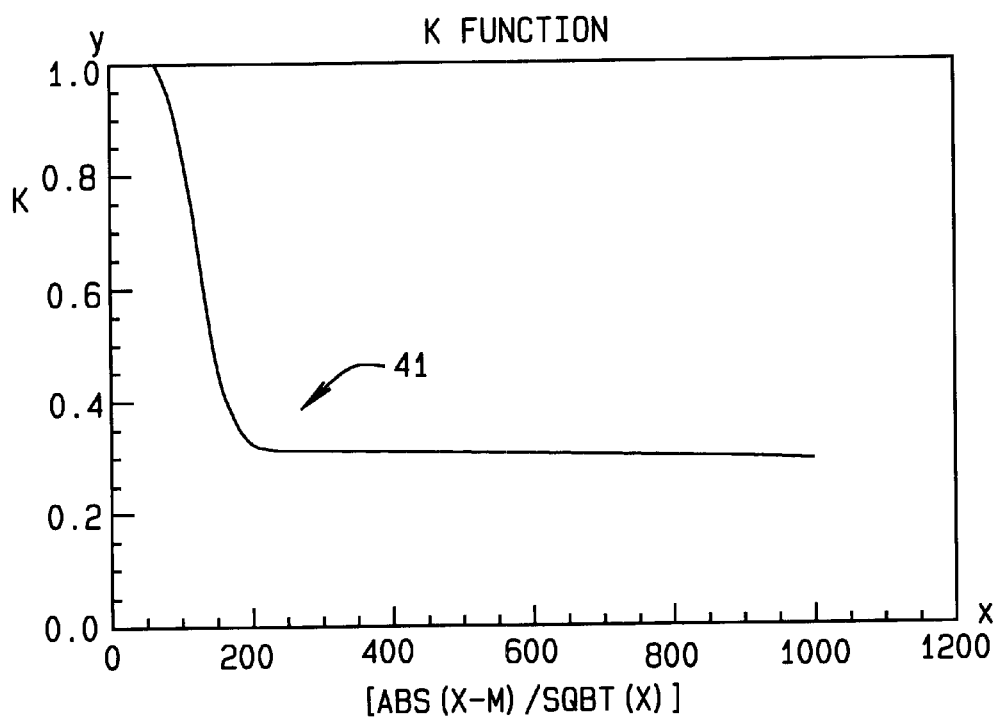
FIG. 5 is a graph illustrating a first example of a function utilized by the EDR processing component shown in FIG. 4 to subtract a predetermined amount of local mean intensity value from the input signal.

An example of the mathematical function performed by the FUNCTION component 34 to obtain an appropriate value for the k constant used in Equation 4 is shown in FIG. 5. The values of the k constant correspond to the Y axis. The X axis corresponds to the gray scale image intensity. The function, which corresponds to curve 41, is expressed by the equation:

$$\text{K\_Index}=\text{ABS}(x(i, j)-\bar{x}(i, j))/\text{SQRT}(x(i, j)), \quad \text{Eq. 5}$$

where ABS(x(i, j)−$\bar{x}$(i, j)) corresponds to the absolute value of the difference between the input intensity value and the local mean intensity value and SQRT(x (i, j)) corresponds to the square root of the input intensity value. The k_Index value obtained using Equation 5 is used to index a k lookup table in the FUNCTION component 34, which causes a k value to be output from the lookup table of the FUNCTION component 34. The k value is then utilized by the FUNCTION component 34 to calculate the Adjusted_Mean value of Equation 4. The k values on the vertical axis corresponds to particular points on the curve 41 shown in FIG. 5 for particular K_Index values.

It should be noted that virtually an infinite number of functions can be utilized by the FUNCTION component 34 shown in FIG. 4 to produce an appropriate k_Index value which, in turn, is used in Equation 4 to obtain the constant k from the lookup table of the FUNCTION component 34. Generally, the mathematical function utilized by the FUNCTION component 34 will result in the value of the k constant being relatively large (i.e., closer to 1) for relatively small differences between the input intensity value and the local mean intensity value and relatively small for relatively small differences between the input intensity value and the local mean intensity value.

Also, the mathematical function could be based solely on the input intensity value. If based solely on the input intensity value, the value of k will be relatively large for relatively small input intensity values and relatively small for relatively large input intensity values. The effects of these variations of the k constant on the Adjusted_Mean value output to the BOOST component 33 can be readily seen from Equation 4.

Therefore, the EDR processing component shown in FIG. 4 compresses the image, if necessary, down to a range of between 0 and 255 while preserving high frequency contrast information in the manner described above with reference to FIG. 3 and, in addition, suppresses ringing at region boundaries within the image and prevents artifacts associated with negative enhanced contrast.

Figure 6:
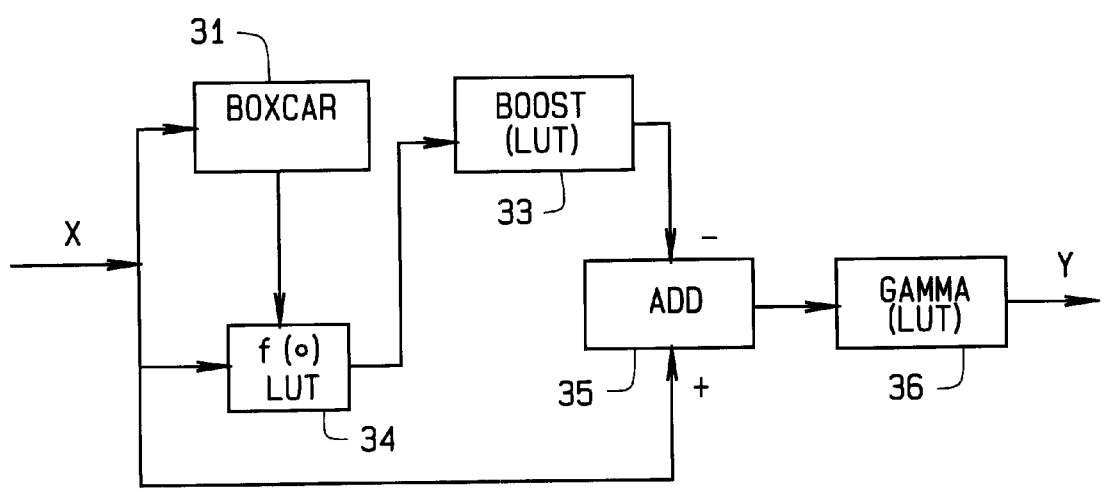
FIG. 6 is a block diagram of the EDR processing component of the invention in accordance with alternative embodiment which may be implemented by the computer of the x-ray imaging system shown in FIG. 2.

FIG. 6 is an alternative embodiment of the EDR processing component of the invention. The EDR processing component shown in FIG. 6 is identical to the EDR processing component shown in FIG. 4 with the exception that the EDR processing component shown in FIG. 6 does not include the MAX component 32. In accordance with this embodiment, the EDR processing component does not automatically adapt to the dynamic range of the input image as in the embodiments of FIGS. 3 and 4. Rather, the dynamic range is either fixed to a desired dynamic range or is selected by a user (not shown). The BOOST component 33 then determines the percentage of the local mean intensity value to be subtracted from the input intensity value based on the fixed or selected dynamic range.

All of the other components of the EDR processing component shown in FIG. 6 operate in the same manner as the respective components of the EDR processing component shown in FIG. 4. The operations performed by the EDR processing component of FIG. 6 can be algorithmically expressed as:

$$y(i, j)=\text{GAMMA}[(x(i, j)-\text{BOOST}[f(x(i, j),[\overline{x}](i, j))])], \quad \text{Eq. 6}$$

where y(i, j,) is the (i, j)$^{th}$ pixel value of the output image, x(i, j) is the (i, j)$^{th}$ pixel value of the input image and $[\overline{x}]$(i, j) is the local mean intensity value of the (i, j)$^{th}$ pixel derived from a BOXCAR average. It can be seen that the functions of the MAX component contained in Equations 2 and 3 are absent from Equation 6.

However, even without utilizing the MAX component 32 shown in FIG. 4, the EDR processing component shown in FIG. 6 prevents artifacts associated with enhanced blacks from occurring in the compressed image. This is due to the fact that the FUNCTION component 34 produces an Adjusted_Mean value which results in a smaller percentage of the local mean intensity value being subtracted from the input image intensity value when the difference between the local mean intensity value and the input intensity value is relatively large. This prevents the contrast of the darker regions in the image from being dramatically increased.

It will be understood by those skilled in the art that the invention has been described with reference to the preferred embodiments, but that the invention is not limited to these embodiments. Those skilled in the art will understand that modifications can be made to the embodiments discussed above which are within the scope of the invention.

What is claimed is:

1. An extended dynamic range processing component for processing an input image to generate an output image which has been compressed down to a desired gray scale intensity range, the EDR processing component performing an EDR algorithm, the EDR processing component comprising:

logic configured to process the input image in accordance with the EDR algorithm to generate the compressed output image, the logic determining a local mean intensity value of the input image based on an input image intensity value and a plurality of image intensity values surrounding the input image intensity value, the logic utilizing the local mean intensity value to automatically determine the dynamic range of the input image, the logic utilizing the determination of the dynamic range and the local mean intensity value to determine a percentage of the local mean intensity value to be subtracted from the input image intensity value, the logic subtracting the determined percentage of the local mean intensity value from the input image intensity value to compress the input image intensity value down to the desired gray scale intensity range.

2. The EDR processing component of claim 1, wherein after the logic subtracts the determined percentage of the local mean intensity value from the input image intensity value, the logic determines whether the compressed input image intensity value has been compressed down to the desired gray scale intensity range, and, if it is determined that the compressed input image intensity value has not been fully compressed down to the desired gray scale intensity range, the logic further compresses the compressed input image intensity value down to the desired gray scale range.

3. The EDR processing component of claim 2, wherein the logic comprises:

a BOXCAR component, the BOXCAR component receiving the input image intensity value and the plurality of image intensity values surrounding the input image intensity value and calculating the local mean intensity value based on the input image intensity value and the plurality of surrounding input image intensity values;

a MAX component, the MAX component receiving the local mean intensity value calculated by the BOXCAR component, the MAX component utilizing the local mean intensity value calculated by the BOXCAR component to determine the dynamic range of the input image;

a BOOST component, the BOOST component receiving the local mean intensity value from the BOXCAR component and receiving an indication of the dynamic range of the input image from the MAX component, the BOOST component utilizing the local mean intensity value and the indication of the dynamic range to determine the percentage of the local mean intensity value to be subtracted from the input image intensity value;

an ADD component, the ADD component receiving the percentage of the local mean intensity value from the BOOST component and receiving the input image intensity value, the ADD component subtracting the percentage of the local mean intensity value from the input image intensity value to obtain the compressed input image intensity value; and a GAMMA component, the GAMMA component receiving the compressed input image intensity value from the ADD component, wherein the GAMMA component determines whether the compressed input image intensity value is within the desired gray scale intensity range, the GAMMA component further compressing the compressed input image intensity value down to the desired gray scale range if the GAMMA component determines that the compressed input image intensity value received from the ADD component is not within the desired gray scale intensity range.

4. The EDR processing component of claim 3, wherein the BOOST component comprises at least one lookup table, the BOOST component lookup table being indexed by the local mean intensity value received from the BOXCAR component and by the indication of the dynamic range received from the MAX component, the BOOST component lookup table outputting a value from the indexed location in the lookup table, wherein the value output from the BOOST component lookup table corresponds to the percentage of the local mean intensity value received by the ADD component and subtracted from the input image intensity value by the ADD component.

5. The EDR processing component of claim 4, wherein the BOOST component comprises a plurality of lookup tables, and wherein the indication of the dynamic range received by the BOOST component from the MAX component selects one of the plurality of lookup tables, and wherein the local mean intensity value received by the BOOST component from the BOXCAR component indexes a particular location in the selected lookup table.

6. The EDR processing component of claim 5, wherein the GAMMA component receives the indication of the dynamic range from the MAX component, the GAMMA component comprising at least one lookup table, the GAMMA component lookup table being indexed by the compressed input image intensity value received from the ADD component and by the indication of the dynamic range received from the MAX component, the GAMMA component lookup table outputting an output image intensity value which is within the desired dynamic range, wherein the values stored in the GAMMA component lookup table are pre-selected to perform a roll off function, wherein when the indication of the dynamic range indicates that the dynamic range is relatively large, the output image intensity value output from the GAMMA component lookup table will correspond to a relatively gradual roll off of the compressed input image intensity value received from the ADD component, and wherein when the indication of the dynamic range indicates that the dynamic range is relatively small, the output image intensity value output from the GAMMA component lookup table will correspond to a relatively less gradual roll off of the compressed input image intensity value received from the ADD component.

7. The EDR processing component of claim 6, wherein the EDR algorithm performed by the EDR processing component is expressed algorithmically as:

$$y(i, j) = \text{GAMMA}[\text{MAX}[\bar{x}], (x(i, j) - \text{BOOST}[\text{MAX}[\bar{x}], \bar{x}(i, j)])].$$

wherein i and j are coordinates which define a row and column, respectively, of a pixel in the input and output images, and wherein y(i, j) is an output image intensity value for an $(i, j)^{th}$ pixel output from the GAMMA component, and wherein x(i, j) corresponds to the input image intensity value of the $(i, j)^{th}$ pixel, and wherein $\bar{x}(i, j)$ corresponds to the local mean intensity value of the $(i, j)^{th}$ pixel output from the BOXCAR component, and wherein MAX[$\bar{x}$] is the indication of the dynamic range output from the MAX component, and wherein BOOST[MAX[$\bar{x}$],$\bar{x}(i, j)$] is the percentage of the local mean intensity value output from the BOOST component.

8. The EDR processing component of claim 7, wherein the logic comprises a computer, the computer comprising a processor configured to perform the EDR algorithm, the EDR algorithm corresponding to functionalities of the BOXCAR, MAX, BOOST, ADD and GAMMA components, wherein the EDR algorithm is performed in software being executed by the processor.

9. The EDR processing component of claim 7, wherein the logic is comprised as a combination of integrated circuits configured to perform the EDR algorithm wherein the combination of integrated circuits corresponds to hardware configured to perform the EDR algorithm.

10. An extended dynamic range processing component for processing an input image to generate an output image which has been compressed down to a desired gray scale intensity range, the EDR processing component performing an EDR algorithm, the EDR processing component comprising:

logic configured to process the input image in accordance with the EDR algorithm to generate the compressed output image, the logic determining a local mean intensity value of the input image based on an input image intensity value and a plurality of image intensity values surrounding the input image intensity value, the logic calculating a difference between the local mean intensity value and the input image intensity value, the logic utilizing the calculated difference to determine a percentage of the local mean intensity value to be subtracted from the input image intensity value to compress the input image intensity value down to the desired gray scale intensity range, the logic subtracting the determined percentage of the local mean intensity value from the input image intensity value to compress the input image intensity value down to the desired gray scale intensity range.

11. The EDR processing component of claim 10, wherein after the logic subtracts the determined percentage of the local mean intensity value from the input image intensity value, the logic determines whether the compressed input image intensity value has been compressed down to the desired gray scale intensity range, and, if it is determined that the compressed input image intensity value has not been fully compressed down to the desired gray scale intensity range, the logic further compresses the compressed input image intensity value down to the desired gray scale range.

12. The EDR processing component of claim 11, wherein the logic comprises;

a BOXCAR component, the BOXCAR component receiving the input image intensity value and the plurality of image intensity.values surrounding the input image intensity value and calculating the local mean intensity value based on the input image intensity value and the plurality of surrounding input image intensity values;

a FUNCTION component, the FUNCTION component receiving the 10 local mean intensity value calculated by the BOXCAR component, the FUNCTION component receiving the input image intensity value, the FUNCTION component calculating the difference between the local mean intensity value calculated by the BOXCAR component and the input image intensity value, the FUNCTION component processing the difference in accordance with a predetermined function to obtain an Adjusted_Mean value;

a BOOST component, the BOOST component receiving the Adjusted_Mean value from the FUNCTION component, the BOOST component utilizing the Adjusted_Mean value to obtain a percentage of the local mean intensity value to be subtracted from the input image intensity value;

an ADD component, the ADD component receiving the percentage of the local mean intensity value from the BOOST component and receiving the input image intensity value, the ADD component subtracting the percentage of the local mean intensity value from the input image intensity value to obtain the compressed input image intensity value; and a GAMMA component, the GAMMA component receiving the compressed input image intensity value from the ADD component, wherein the GAMMA component determines whether the compressed input image intensity value is within the desired gray scale intensity range, the GAMMA component further compressing the compressed input image intensity value down to the desired gray scale range if the GAMMA component determines that the compressed input image intensity value received from the ADD component is not within the desired gray scale intensity range.

13. The EDR processing component of claim 12, wherein the BOOST component comprises at least one lookup table, the BOOST component lookup table being indexed by the Adjusted_Mean value received from the FUNCTION component, the BOOST component lookup table outputting a value from the indexed location in the lookup table, wherein the value output from the BOOST component lookup table corresponds to the percentage of the local mean intensity value received by the ADD component and subtracted from the input image intensity value by the ADD component.

14. The EDR processing component of claim 13, wherein the GAMMA component comprises at least one lookup table, the GAMMA component lookup table being indexed by the compressed input image intensity value received from the ADD component, the GAMMA component lookup table outputting an output image intensity value which is within the desired dynamic range, wherein the values stored in the GAMMA component lookup table are pre-selected to perform a roll off function which gradually compresses the compressed input image intensity values down to the desired gray scale intensity range.

15. The EDR processing component of claim 14, wherein the EDR algorithm performed by the EDR processing component is expressed algorithmically as:

$$y(i, j) = \text{GAMMA}[(x(i, j) - \text{BOOST}[f(x(i, j), \bar{x}(i, j)])],$$

wherein i and j are coordinates which define a row and column, respectively, of a pixel in the input and output images, and wherein y(i, j) is an output image intensity value for an $(i, j)^{th}$ pixel output from the GAMMA component, and wherein x(i, j) corresponds to the input image intensity value of the $(i, j)^{th}$ pixel, and wherein $\bar{x}(i, j)$ corresponds to the local mean intensity value of the $(i, j)^{th}$ pixel output from the BOXCAR component, and wherein $\text{BOOST}[f(x(i, j), \bar{x}(i, j)]$ is the percentage of the local mean intensity value output from the BOOST component.

16. The EDR processing component of claim 15, wherein the logic comprises a computer, the computer comprising a processor configured to perform the EDR algorithm, the EDR algorithm corresponding to functionalities of the BOXCAR, BOOST, ADD and GAMMA components, wherein the EDR algorithm is performed in software being executed by the processor.

17. The EDR processing component of claim 15, wherein the logic is comprised as a combination of integrated circuits configured to perform the EDR algorithm wherein the combination of integrated circuits corresponds to hardware configured to perform the EDR algorithm.

18. An extended dynamic range processing component for processing an input image to generate an output image which has been compressed down to a desired gray scale intensity range, the EDR processing component performing an EDR algorithm, the EDR processing component comprising:

logic configured to process the input image in accordance with the EDR algorithm to generate the compressed output image, the logic determining a local mean intensity value of the input image based on an input image intensity value and a plurality of image intensity values surrounding the input image intensity value, the logic calculating a difference between the local mean intensity value and the input image intensity value, the logic utilizing the local mean intensity value to automatically determine the dynamic range of the input image, the logic utilizing the determination of the dynamic range and the calculated difference to determine a percentage of the local mean intensity value to be subtracted from the input image intensity value to compress the input image intensity value down to the desired gray scale intensity range, the logic subtracting the determined percentage of the local mean intensity value from the input image intensity value to compress the input image intensity value down to the desired gray scale intensity range.

19. The EDR processing component of claim 18, wherein after the logic subtracts the determined percentage of the local mean intensity value from the input image intensity value, the logic determines whether the compressed input image intensity value has been compressed down to the desired gray scale intensity range, and, if it is determined that the compressed input image intensity value has not been fully compressed down to the desired gray scale intensity range, the logic further compresses the compressed input image intensity value down to the desired gray scale range.

20. The EDR processing component of claim 19, wherein the logic comprises:

a BOXCAR component, the BOXCAR component receiving the input image intensity value and the plurality of image intensity values surrounding the input image intensity value and calculating the local mean intensity value based on the input image intensity value and the plurality of surrounding input image intensity values;

a FUNCTION component, the FUNCTION component receiving the local mean intensity value calculated by the BOXCAR component, the FUNCTION component receiving the input image intensity value, the FUNCTION component calculating the difference between the local mean intensity value calculated by the BOXCAR component and the input image intensity value, the FUNCTION component processing the difference in accordance with a predetermined function to obtain an Adjusted_Mean value;

a MAX component, the MAX component receiving the local mean intensity value calculated by the BOXCAR component, the MAX component utilizing the local mean intensity value calculated by the BOXCAR component to determine the dynamic range of the input image;

a BOOST component, the BOOST component receiving the Adjusted_Mean value from the FUNCTION component, the BOOST component receiving an indication of the dynamic range from the BOXCAR component, the BOOST component utilizing the Adjusted_Mean value and the indication of the dynamic range to obtain a percentage of the local mean intensity value to be subtracted from the input image intensity value;

an ADD component, the ADD component receiving the percentage of the local mean intensity value from the BOOST component and receiving the input image intensity value, the ADD component subtracting the percentage of the local mean intensity value from the input image intensity value to obtain the compressed input image intensity value; and a GAMMA component, the GAMMA component receiving the compressed input image intensity value from the ADD component, wherein the GAMMA component determines whether the compressed input image intensity value is within the desired gray scale intensity range, the GAMMA component further compressing the compressed input image intensity value down to the desired gray scale range if the GAMMA component determines that the compressed input image intensity value received from the ADD component is not within the desired gray scale intensity range.

21. The EDR processing component of claim 20, wherein the BOOST component comprises at least one lookup table, the BOOST component lookup table being indexed by the Adjusted_Mean value received from the FUNCTION component and by the indication of the dynamic range received from the MAX component, the BOOST component lookup table outputting a value from the indexed location in the lookup table, wherein the value output from the BOOST component lookup table corresponds to the percentage of the local mean intensity value received by the ADD component and subtracted from the input image intensity value by the ADD component.

22. The EDR processing component of claim 21, wherein the GAMMA component comprises at least one lookup table, the GAMMA component receiving the indication of the dynamic range from the MAX component, the GAMMA component lookup table being indexed by the compressed input image intensity value received from the ADD component and by the indication of the dynamic range, the GAMMA component lookup table outputting an output image intensity value which is within the desired dynamic range, wherein the values stored in the GAMMA component lookup table are pre-selected to perform a roll off function, wherein when the indication of the dynamic range indicates that the dynamic range is relatively large, the output image intensity value output from the GAMMA component lookup table will correspond to a relatively gradual roll off of the compressed input image intensity value received from the ADD component, and wherein when the indication of the dynamic range indicates that the dynamic range is relatively small, the output image intensity value output from the GAMMA component lookup table will correspond to a relatively less gradual roll off of the compressed input image intensity value received from the ADD component.

23. The EDR processing component of claim 22, wherein the EDR algorithm performed by the EDR processing component is expressed algorithmically as:

$$y(i, j)=\text{GAMMA}[\text{MAX}[\overline{x}],(x(i, j)-\text{BOOST}[\text{MAX}[\overline{x}],f(x(i, j),\overline{x}](i, j))])],$$

wherein i and j are coordinates which define a row and column, respectively, of a pixel in the input and output images, and wherein y(i, j) is an output image intensity value for an $(i, j)^{th}$ pixel output from the GAMMA component, and wherein x(i, j) corresponds to the input image intensity value of the $(i, j)^{th}$ pixel, and wherein $\overline{x}(i, j)$ corresponds to the local mean intensity value of the $(i, j)^{th}$ pixel output from the BOXCAR component, and wherein MAX[$\overline{x}$] is the indication of the dynamic range output from the MAX component, and wherein $f(x(i, j),\overline{x}(i, j))$ is the function that processes the difference between the input image intensity value and the local mean intensity value to obtain the Adjusted_Mean value, and wherein BOOST[MAX[$\overline{x}$],f(x(i, j),$\overline{x}$](i, j))] is the percentage of the local mean intensity value output from the BOOST component.

24. The EDR processing component of claim 23, wherein the logic comprises a computer, the computer comprising a processor configured to perform the EDR algorithm, the EDR algorithm corresponding to functionalities of the BOXCAR, MAX, FUNCTION, BOOST, ADD and GAMMA components, wherein the EDR algorithm is performed in software being executed by the processor.

25. The EDR processing component of claim 23, wherein the logic is comprised as a combination of integrated circuits configured to perform the EDR algorithm wherein the combination of integrated circuits corresponds to hardware configured to perform the EDR algorithm.

26. A method for performing an extended dynamic range (EDR) algorithm, the algorithm processing an input image to generate an output image which has been compressed down to a desired gray scale intensity range, the method comprising the steps of:

determining a local mean intensity value of the input image based on an input image intensity value and a plurality of image intensity values surrounding the input image intensity value;

utilizing the local mean intensity value to automatically determine the dynamic range of the input image;

utilizing the determination of the dynamic range and the local mean intensity value to determine a percentage of the local mean intensity value to be subtracted from the input image intensity value; and subtracting the determined percentage of the local mean intensity value from the input image intensity value to compress the input image intensity value down to the desired gray scale intensity range.

27. A method for performing an extended dynamic range (EDR) algorithm, the algorithm processing an input image to generate an output image which has been compressed down to a desired gray scale intensity range, the method comprising the steps of:

determining a local mean intensity value of the input image based on an input image intensity value and a plurality of image intensity values surrounding the input image intensity value;

calculating a difference between the local mean intensity value and the input image intensity value;

utilizing the calculated difference to determine a percentage of the local mean intensity value to be subtracted from the input image intensity value to compress the input image intensity value down to the desired gray scale intensity range; and subtracting the determined percentage of the local mean intensity value from the input image intensity value to compress the input image intensity value down to the desired gray scale intensity range.

28. A method for performing an extended dynamic range (EDR) algorithm, the algorithm processing an input image to generate an output image which has been compressed down to a desired gray scale intensity range, the method comprising the steps of:

determining a local mean intensity value of the input image based on an input image intensity value and a plurality of image intensity values surrounding the input image intensity value;

calculating a difference between the local mean intensity value and the input image intensity value;

utilizing the local mean intensity value to automatically determine the dynamic range of the input image;

utilizing the determination of the dynamic range and the calculated difference to determine a percentage of the local mean intensity value to be subtracted from the input image intensity value to compress the input image intensity value down to the desired gray scale intensity range; and subtracting the determined percentage of the local mean intensity value from the input image intensity value to compress the input image intensity value down to the desired gray scale intensity range.

* * * * *

UNITED STATES PATENT AND TRADEMARK OFFICE
CERTIFICATE OF CORRECTION

PATENT NO. : 6,546,124 B1
DATED : April 8, 2003
INVENTOR(S) : Hopple et al.

It is certified that error appears in the above-identified patent and that said Letters Patent is hereby corrected as shown below:

Column 13,
Line 53, delete "$y(i,j)=GAMMA[MAX[\bar{x}], (x(i,j) - BOOST[MAX[\bar{x}], \bar{x}(i,j)])],$".

and insert therefor -- $y(i,j)=GAMMA[MAX[\bar{x}], (x(i,j) - BOOST[MAX[\bar{x}], \bar{x}(i,j)])],$ --.

Signed and Sealed this

Twenty-third Day of September, 2003

JAMES E. ROGAN
*Director of the United States Patent and Trademark Office*